(12) United States Patent
Moss et al.

(10) Patent No.: US 12,055,798 B2
(45) Date of Patent: Aug. 6, 2024

(54) INTEGRATED OPTICAL PHASED ARRAY ELECTRONIC CONTROL

(71) Applicant: Analog Photonics LLC, Boston, MA (US)

(72) Inventors: Benjamin Roy Moss, Cambridge, MA (US); Erman Timurdogan, Somerville, MA (US); Christopher Vincent Poulton, Cambridge, MA (US); Shahriar Shahramian, Warren, NJ (US)

(73) Assignee: Analog Photonics LLC, Boston, MA (US)

( * ) Notice: Subject to any disclaimer, the term of this patent is extended or adjusted under 35 U.S.C. 154(b) by 751 days.

(21) Appl. No.: 17/192,169

(22) Filed: Mar. 4, 2021

(65) Prior Publication Data

US 2021/0278707 A1 Sep. 9, 2021

Related U.S. Application Data

(60) Provisional application No. 62/984,883, filed on Mar. 4, 2020.

(51) Int. Cl.
*G02F 1/01* (2006.01)
*G01S 7/48* (2006.01)
(Continued)

(52) U.S. Cl.
CPC .............. *G02F 1/0121* (2013.01); *G01S 7/48* (2013.01); *G01S 7/481* (2013.01); *G01S 7/4815* (2013.01); *G02B 26/06* (2013.01); *G02F 2203/50* (2013.01)

(58) Field of Classification Search
CPC ...... G02F 1/0121; G02F 2203/50; G01S 7/48; G01S 7/481; G01S 7/4815; G02B 26/06
(Continued)

(56) References Cited

U.S. PATENT DOCUMENTS 4,620,193 A 10/1986 Heeks
10,809,591 B2 10/2020 Watts et al.
(Continued)

OTHER PUBLICATIONS

Sah et al., "Design and Analysis of a Wideband 15-35-GHz Quadrature Phase Shifter With Inductive Loading", IEEE Transactions on Microwave Theory and Techniques, vol. 61, No. 8, Aug. 2013.
(Continued)

*Primary Examiner* — Joseph P Martinez
*Assistant Examiner* — Grant A Gagnon
(74) *Attorney, Agent, or Firm* — Young Basile Hanlon & MacFarlane, P.C.

(57) ABSTRACT

Controlling an optical phased array includes applying optical phase shifts by an array of phase shifter (PS) elements, each PS element applying an optical phase shift based on an input voltage signal applied across first and second terminals of the PS element, providing output voltage signals from an array of driver elements. During a charging time period, each driver element provides an output voltage signal to determine a corresponding input voltage signal applied across at least one of the PS elements; an array of switches control connectivity between the driver elements and respective PS elements; and all of the second terminals of all of the PS elements in the array of PS elements are maintained at a common voltage. The total number of switches in the array of switches is at least as large as the total number of PS elements in the array of PS elements.

20 Claims, 7 Drawing Sheets

(51) Int. Cl.
*G01S 7/481* (2006.01)
*G02B 26/06* (2006.01)

(58) Field of Classification Search
USPC .......................................................... 359/279
See application file for complete search history.

(56) References Cited

U.S. PATENT DOCUMENTS

| | | |
|---|---|---|
| 2009/0245795 A1 | 10/2009 | Joyner et al. |
| 2015/0346340 A1 | 12/2015 | Yaacobi et al. |
| 2019/0056499 A1 | 2/2019 | Fatemi et al. |
| 2020/0393737 A1 | 12/2020 | Hosseini et al. |

OTHER PUBLICATIONS

Farshid Ashtiani et al., "NxN Optical Phased Array with 2N Phase Shifters", Optics Express, vol. 27, No. 19, Sep. 16, 2019, pp. 27183-27190.

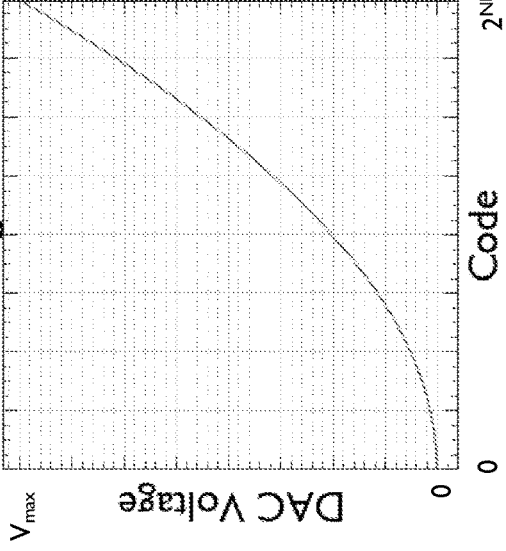
FIG. 6A Phase Shifter Response
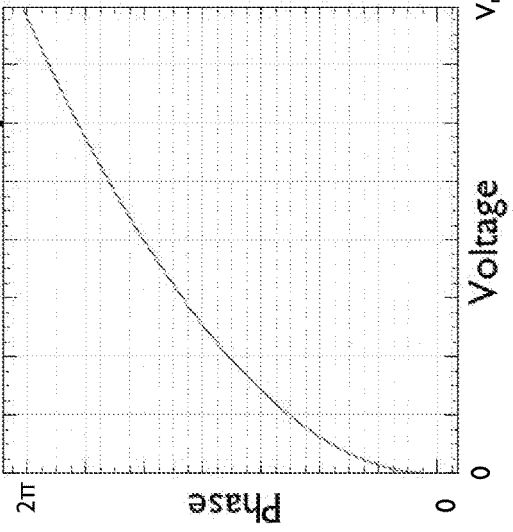
FIG. 6B DAC Voltage vs. Code
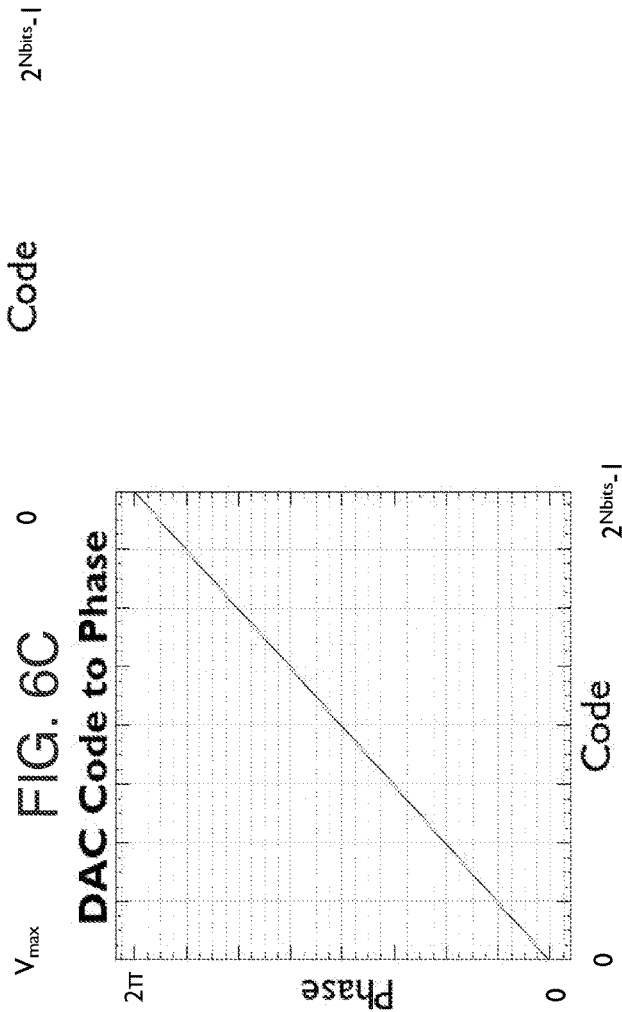
FIG. 6C DAC Code to Phase

INTEGRATED OPTICAL PHASED ARRAY ELECTRONIC CONTROL

CROSS-REFERENCE TO RELATED APPLICATION(S)

This application claims priority to and the benefit of U.S. Provisional Application Ser. No. 62/984,883, entitled "Integrated Optical Phased Array Electronic Control," filed Mar. 4, 2020, the entire disclosure of which is hereby incorporated by reference.

STATEMENT AS TO FEDERALLY SPONSORED RESEARCH

This invention was made with government support under the following contract: DARPA Contract No. HR0011-16-C-0108. The government has certain rights in the invention.

TECHNICAL FIELD

This disclosure relates to integrated optical phased array electronic control.

BACKGROUND

A variety of techniques can be used to control the phase of optical waves that are emitted from the emitter elements in an optical phased array, such as an optical phased array formed on a photonic integrated circuit (PIC). Some of the techniques integrate phase shifter elements controlled by a control circuit and optically coupled to the emitter elements within the PIC. The characteristics of the optical phase shifter elements may affect the control circuit architecture. For example, in a two-dimensional array of emitter elements, there may be a corresponding two-dimensional array of thermal phase shifter elements that induce an optical phase shift based on a change in a refractive index due to temperature. The temperature can be controlled, for example, by a current applied in a row-column arrangement. However, for phase shifter elements other than thermal phase shifter elements (e.g., capacitive phase shifter elements), there may be impairments from such a row-column control signal arrangement due to crosstalk from a selected element to unselected elements.

SUMMARY

In one aspect, in general, an apparatus comprises: an array of emitter elements; an array of phase shifter elements, each phase shifter element configured to apply an optical phase shift to an optical wave that propagates through the phase shifter element and propagates to a corresponding emitter element, where the optical phase shift is based on an input voltage signal applied across first and second terminals of the phase shifter element; an array of driver elements, each driver element configured to provide an output voltage signal during a charging time period to determine a corresponding input voltage signal applied across at least one of the phase shifter elements, where all of the second terminals of all of the phase shifter elements in the array of phase shifter elements are maintained at a common voltage during the charging time period; and an array of switches configured to control connectivity between the driver elements and respective phase shifter elements during the charging time period. The total number of switches in the array of switches is at least as large as the total number of phase shifter elements in the array of phase shifter elements.

Aspects can include one or more of the following features.

The array of phase shifter elements is provided on a photonic integrated circuit.

The array of driver elements is provided on an electronic integrated circuit electrically connected to the photonic integrated circuit.

The array of switches is provided on the electronic integrated circuit.

At least one of the driver elements in the array of driver elements comprises a digital-to-analog converter with an output voltage that is coupled to a plurality of the switches in the array of switches.

The electronic integrated circuit includes capacitors coupled to the switches storing charge accumulated from the output voltage signals provided from the driver elements during the charging time period, and the capacitors provide the input voltage signals applied across the phase shifter elements.

The output voltage signals are connected to the first terminal of one or more of the phase shifter elements that are selected according to the array of switches, and the input voltage signals are provided based on capacitance characteristics of the phase shifter elements.

The array of switches is provided on the photonic integrated circuit.

At least two driver elements in the array of driver elements comprise digital-to-analog converters with outputs coupled to different respective rows of phase shifter elements, and a plurality of column enable signals control the connectivity to a selected column of phase shifter elements that consists of a single phase shifter element from each of the rows of phase shifter elements.

The input voltage signals are provided based on capacitance characteristics of the phase shifter elements.

The array of driver elements is provided on the photonic integrated circuit, and the array of switches is provided on the photonic integrated circuit.

At least two driver elements in the array of driver elements comprise digital-to-analog converters with outputs coupled to different respective rows of phase shifter elements, and a plurality of column enable signals control the connectivity to a selected column of phase shifter elements that consists of a single phase shifter element from each of the rows of phase shifter elements.

The input voltage signals are provided based on capacitance characteristics of the phase shifter elements.

Each phase shifter element in the array of phase shifter elements comprises a reverse-biased diode device.

At least one of the phase shifter elements in the array of phase shifter elements comprises a plurality of reverse-biased diode devices connected in series with each other.

At least one of the phase shifter elements in the array of phase shifter elements comprises a reverse-biased diode device connected in series with an inductor.

Each switch in the array of switches comprises at least a first, second, and third terminal, where a flow of current between the first and second terminals is controlled based on a voltage or current applied at the third terminal.

In another aspect, in general, a method for controlling an optical phased array, the method comprises: applying optical phase shifts by an array of phase shifter elements, each phase shifter element applying an optical phase shift to an optical wave that propagates through the phase shifter element and propagates to a corresponding emitter element of the optical phased array, where the optical phase shift is based on an input voltage signal applied across first and second terminals of the phase shifter element; providing output voltage signals from an array of driver elements, each driver element providing an output voltage signal during a charging time period to determine a corresponding input voltage signal applied across at least one of the phase shifter elements, where all of the second terminals of all of the phase shifter elements in the array of phase shifter elements are maintained at a common voltage during the charging time period; and managing an array of switches to control connectivity between the driver elements and respective phase shifter elements during the charging time period. The total number of switches in the array of switches is at least as large as the total number of phase shifter elements in the array of phase shifter elements.

Aspects can include one or more of the following features.

The charging time period comprises a period of a periodic refresh cycle during which the input voltage signals are refreshed based on capacitance characteristics of the phase shifter elements.

Managing the array of switches to control connectivity of the driver elements comprises selecting a first switch coupled to a first phase shifter element in a group of the plurality of phase shifter elements to allow current flow to the first phase shifter element during the charging time period, and selecting switches coupled to all other phase shifter elements in the group other than the first phase shifter element to substantially prevent current flow during the charging time period.

Aspects can have one or more of the following advantages.

The techniques described herein can be used to electronically control an integrated optical phased array for beam steering. Photonic integrated circuits (PICs) with optical phased arrays feature an increasingly high emitter element count (e.g., from hundreds to tens of thousands of emitter elements, or more). Each optical phase shifter element coupled to a respective emitter element can be controlled using individual phase control to steer the emitted beam formed from interference among the optical waves emitted from the different emitter elements. An individual optical phase shifter element (or simply "phase shifter element") can be controlled electronically by adjusting the voltage across the element and/or by adjusting the current through the element. In some system implementations, one or more electronic integrated circuits (EICs) contain digital-to-analog converters (DACs) to provide individual optical phase shifter control. In such a system, the EIC can be tightly co-designed to meet system constraints including low footprint area and low power consumption. Some implementations use a series switches respectively coupled to each phase shifter element to allow the ability to uniquely address each phase shifter element without unintended voltage crosstalk to unselected phase shifter elements, as explained in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 6A, 6B, and 6C are plots of example transfer functions for linearizing code to phase shift response for a nonlinear DAC circuit.

DETAILED DESCRIPTION

For an optical phased array (OPA) system with a relatively large number of optical phase shifter elements (e.g., thousands), it is useful to have an optimized electronic driver circuit where each individual driver is configured to have a small footprint area, low power consumption, and tight electro-optic integration to meet system constraints. The system circuit architecture can take advantage of device properties to reduce the burden of each driver cell, lowering area, power consumption, and packaging complexity. Such OPA systems can be used in any of a variety of context, such as optical transmitter and/or receiver nodes in a LiDAR system or a free-space optical communication system, for example.

Figure 1:
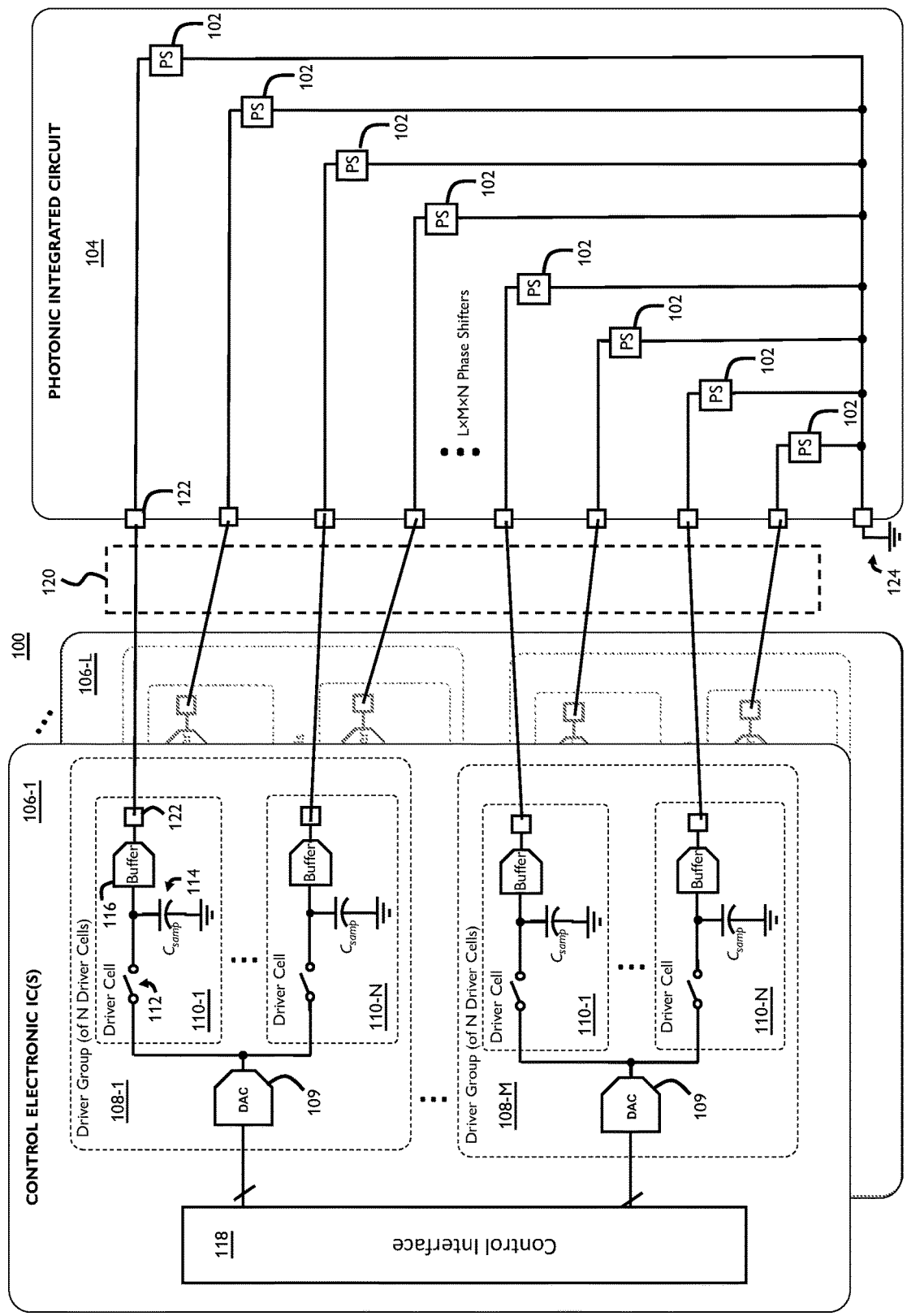
FIG. 1 is a schematic diagram of an example OPA system.

An example OPA system 100 configured for a sample-and-hold circuit architecture for controlling an array of phase shifter (PS) elements 102 of an OPA formed within a PIC 104 is shown in FIG. 1. For example, the phase shifter elements 102 can be implemented as diode structures, which can be fabricated using silicon photonics fabrication procedures with optical waves coupled in and out of the phase shifter elements 102 using a network of optical waveguides, and electrical signals (e.g., voltages and/or currents) coupled in and out using a network of wires. The electrical signals control the phase shifts applied by the phase shifter elements 102. The resulting phase shifted optical waves are emitted from emitter elements (not shown) that are optically coupled to the outputs of respective phase shifter elements 102. The resulting coherently interfering optical waves form an optical beam that can be steered according to the applied phase shifts, as described in more detail in U.S. Patent Publication No. 2020/0393737 and U.S. Pat. No. 10,809,591, each of which is incorporated herein by reference. One or more (a count of L, where L≥1) control EICs 106-1, . . . , 106-L (referred to generally as a control EIC 106) each include M driver groups 108-1, . . . , 108-M (referred to generally as a driver group 108), where each driver group 108 holds N driver cells 110-1, . . . , 110-N (referred to generally as a driver cell 110). A packaging interface includes a connection network 120 between connection structures 122 (such as a copper pillar, wirebond, solder bump, gold stud bump, or other form of electronic connection) for establishing electrical connections between the control EICs 106 and the PIC 104. Alternatively, other examples of an OPA system include a monolithically integrated system that uses an integrated circuit (IC) having elements of all of the control EICs 106 and PIC 104, in which case wires can be fabricated within the IC to provide an electrical connection from a driver cell 110 to a unique phase shifter element 102. Each driver cell 110 includes an analog switch 112 (such as a pass gate or transmission gate, which can be implemented using one or more transistors), a sample capacitor 114 (with capacitance $C_{samp}$), which stores the analog voltage value for an individual phase shifter element 102, and a buffer 116 (which can have a unity, fixed, or variable gain). An analog switch 112 is in a non-conducting (or "open") state when inactive, and when activated (in a "closed" state) based on a control input, a signal conducting path is established between an input terminal and an output terminal. A driver group 108 includes a driver element in the form of a single digital-to-analog converter (DAC) 109 whose analog output is connected to each the N driver cells 110 within that driver group 108.

Since in this example architecture only one DAC 109 is necessary for every driver group 108 of N driver cells 110, the circuit area used within the control EICs 106 can be reduced. The DAC 109 is able to charge a driver cell's sample capacitor 114 if that driver cell's analog switch 112 is active. In some implementations, only one analog switch 112 within a driver group 108 is active (or closed) at a time, enabling sample capacitors 114 to be charged sequentially by the DAC 109. A controller (e.g., a digital controller), which can be included on-chip, includes control interface circuitry 118 within each control EIC 106 to provide the appropriate digital value at the input of each DAC 109. The controller also manages control of each analog switch 112 to ensure that the correct sample capacitor(s) 114 within a driver group 108 are charged at a given time. The number N of driver cells 110 per driver group 108 can be chosen based on factors including the slew rate of the DAC 109, the parasitic load of the phase shifter device, and/or the steering time budgeted by the system architect. This example architecture provides an area advantage by only requiring one DAC circuit per N driver cells, but in other example architectures multiple DACs, or other forms of driver elements configured to drive analog current signals to charge the sample capacitors 114, can be included one or more of the driver groups.

Figure 4:
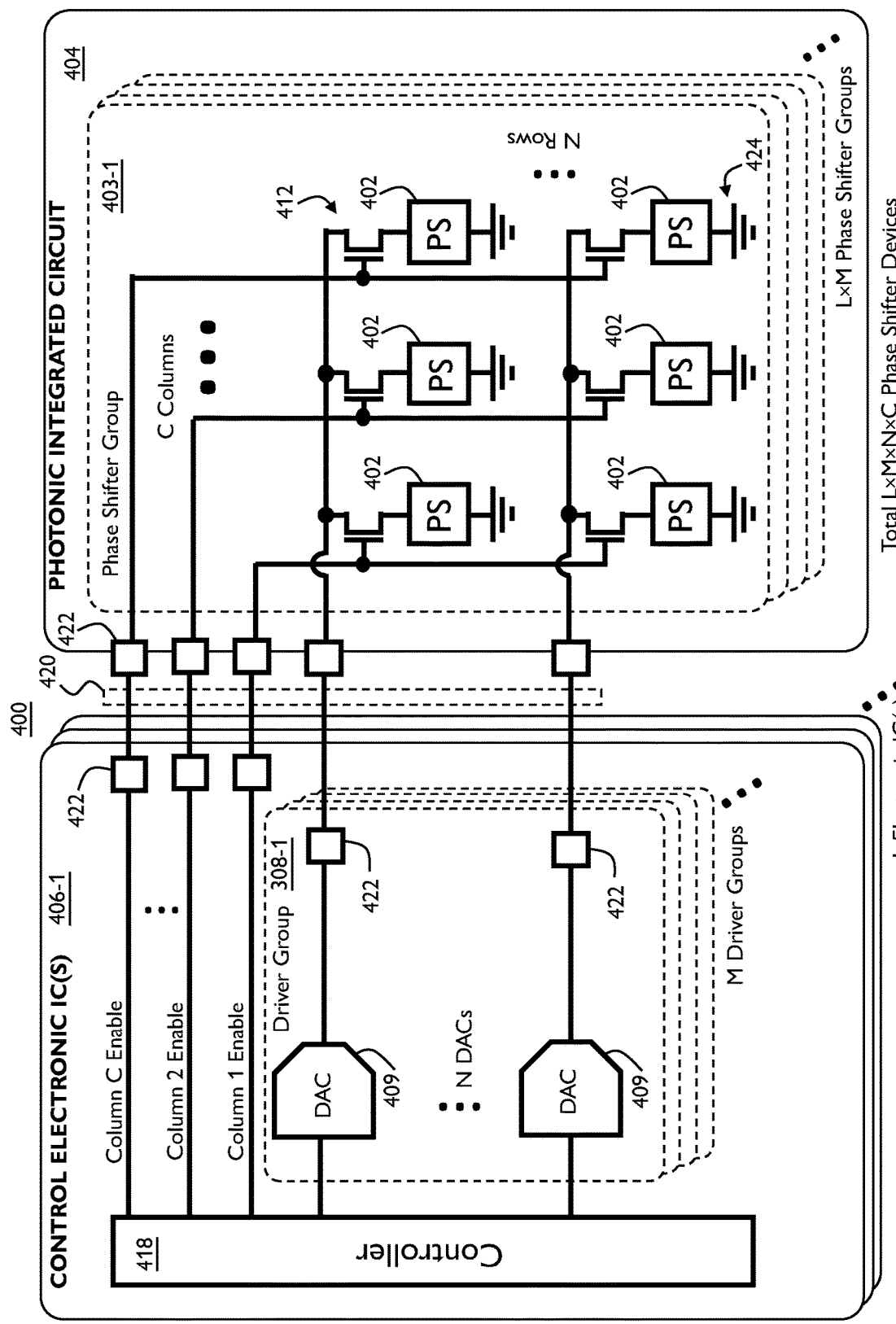
FIG. 4 is a schematic diagram of an example OPA system.
Figure 5:
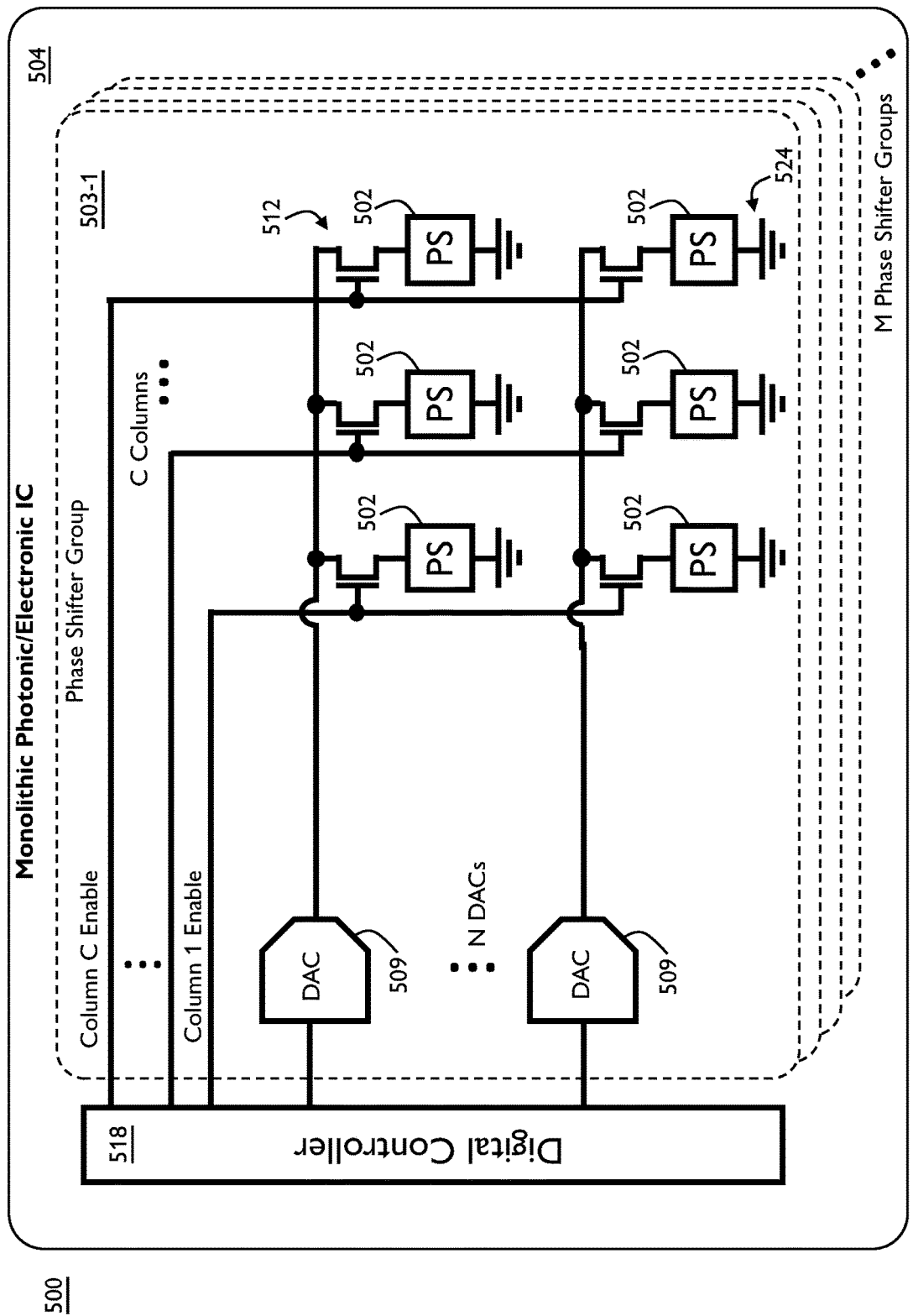
FIG. 5 is a schematic diagram of an example OPA system.

In the example of FIG. 1, the positions of the phase shifter elements 102 are shown schematically in a diagonal arrangement, but the physical locations of phase shifter elements 102 over a substrate of the PIC 104 may be laid out in any arbitrary distribution, such as a two-dimensional (e.g., row-column) physical arrangement, even if there is no row-column control signal arrangement as there is in some of the implementations described below (e.g., FIGS. 4 and 5). Another characteristic of the OPA system 100, and other OPA system implementations described herein, is the connection of a second terminal of all of the phase shifter elements 102 to a common voltage reference 124. For example, the voltage reference 124 can be a zero-voltage ground plane or a non-zero fixed voltage source (e.g., a DC supply voltage). This characteristic of the electrical relationships among the phase shifter elements 102 is able to mitigate the potential impairments that would otherwise be experienced in some row-column control signal arrangements that over-constrain the voltages at the two terminals of the phase shifter elements.

To avoid additional fabrication complexity and cost, many modern silicon photonic fabrication processes do not offer monolithically integrated transistors. In the example of the OPA system 100 shown in FIG. 1, the electronics have been separately fabricated using traditional CMOS processes, shown as one or multiple control EIC(s) 106 (L≥1), and then co-packaged with the PIC 104 separately fabricated using silicon photonics processes. The architecture of this example is tolerant to high phase shifter device leakage, high parasitic packaging capacitance, and resistive (thermal) optical phase shifter devices. In this system, packaging complexity, which is proportional to the number of connections (e.g., copper pillars or solder bumps), is still O(n) with the number of phase shifter elements (n=L×M×N). However, similar advantages can be achieved in other examples where some or all of the circuit elements in the control EICs 106 are monolithically integrated with the PIC 104 in the same wafer fabrication process. A separate EIC, or multiple EICs, may be useful in some implementations if there is a limit to the number of elements that can be driven by a particular type of DAC circuit, or if there is a limit on the number of DACs that can be included on an EIC or PIC due to the size of the DAC circuit, for example.

Figure 2:
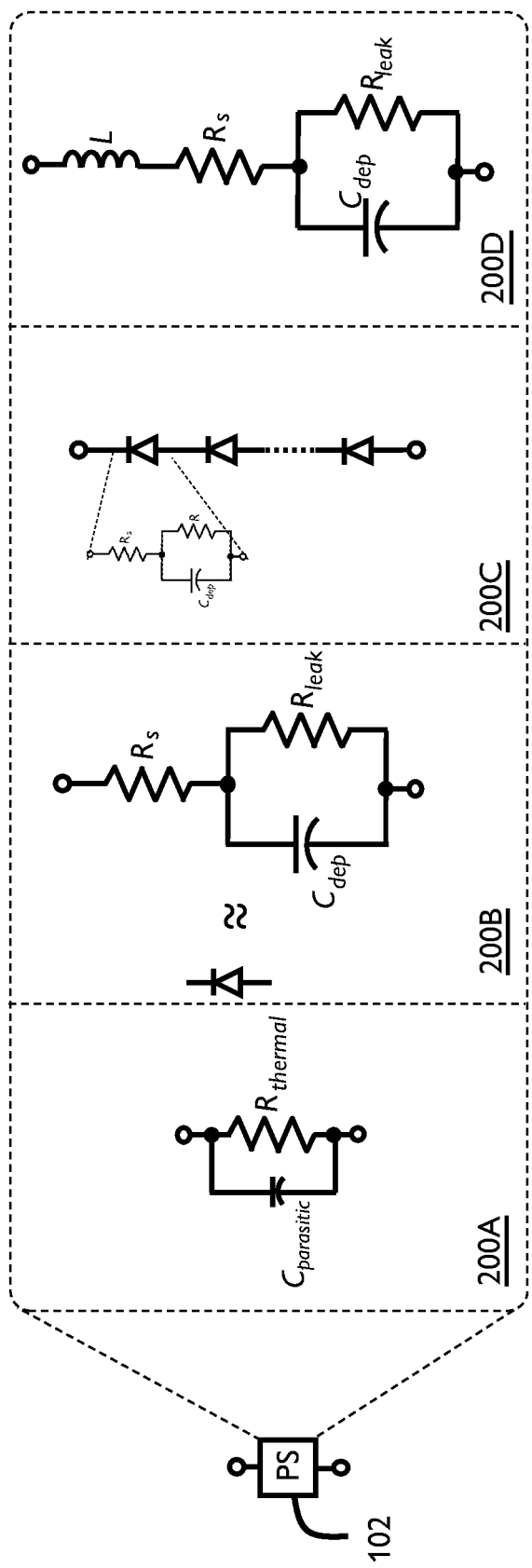
FIG. 2 is a set of circuit diagrams for first-order electrical models of example optical phase shifters.

The optical phase shifter device-level characteristics have a potential impact on the circuit architecture. FIG. 2 shows some example circuits 200A, 200B, 200C, and 200D corresponding to first-order electrical equivalent circuits for different devices that could be used to implement the phase shifter element 102, where the equivalent circuit models the device in its usage region. In circuit 200A, a thermal-based device is primarily electrically resistive, with a small parasitic capacitance in parallel, and can be used with a driver (not shown) that can continuously source and/or sink current. For lower power consumption, circuit 200B corresponds to a diode-based device that can be operated in its reverse-bias regime to be primarily capacitive, represented by a capacitance $C_{dep}$. Such a device will have a parasitic series resistance $R_s$ and a device leakage path represented by $R_{leak}$. If the leakage current is high enough, the device voltage in open-loop droops more than a specified amount relative to a voltage associated with a least significant bit (LSB) within a given refresh duration, and the device may be considered primarily resistive and may require a driver that can continuously source current. However, if the leakage current is small, the device will be able to store its set voltage within a specified time duration. A technique that can be used to reduce the leakage current in an optical phase shifter device is by constructing the device using several diode-based devices connected to each other in series, as shown in circuit 200C. Another potential benefit associated with this series-diode configuration is reducing electric field hot spots, which can also improve the reliability of the optical phase shifter device. Additionally, an inductor could be added to the device to improve speed through inductive peaking, as shown in circuit 200D, which is described in more detail in Suman Sah, Xinmin Yu, and Deukhyoun Heo, "Design and Analysis of a Wideband 15-35-GHz Quadrature Phase Shifter With Inductive Loading." IEEE Transactions on Microwave Theory and Techniques, Vol. 61. No. 8, p. 3024-3033 (August 2013), incorporated herein by reference.

If the leakage path is small enough such that, in an open circuit configuration (i.e., not actively being charged through a closed analog switch), the optical phase shifter's voltage will not droop significantly over a particular refresh duration, then the capacitive charge storage characteristics of the phase shifter element 102 can be used in place of a dedicated sample capacitor 114, as described in more detail below.

Figure 3:
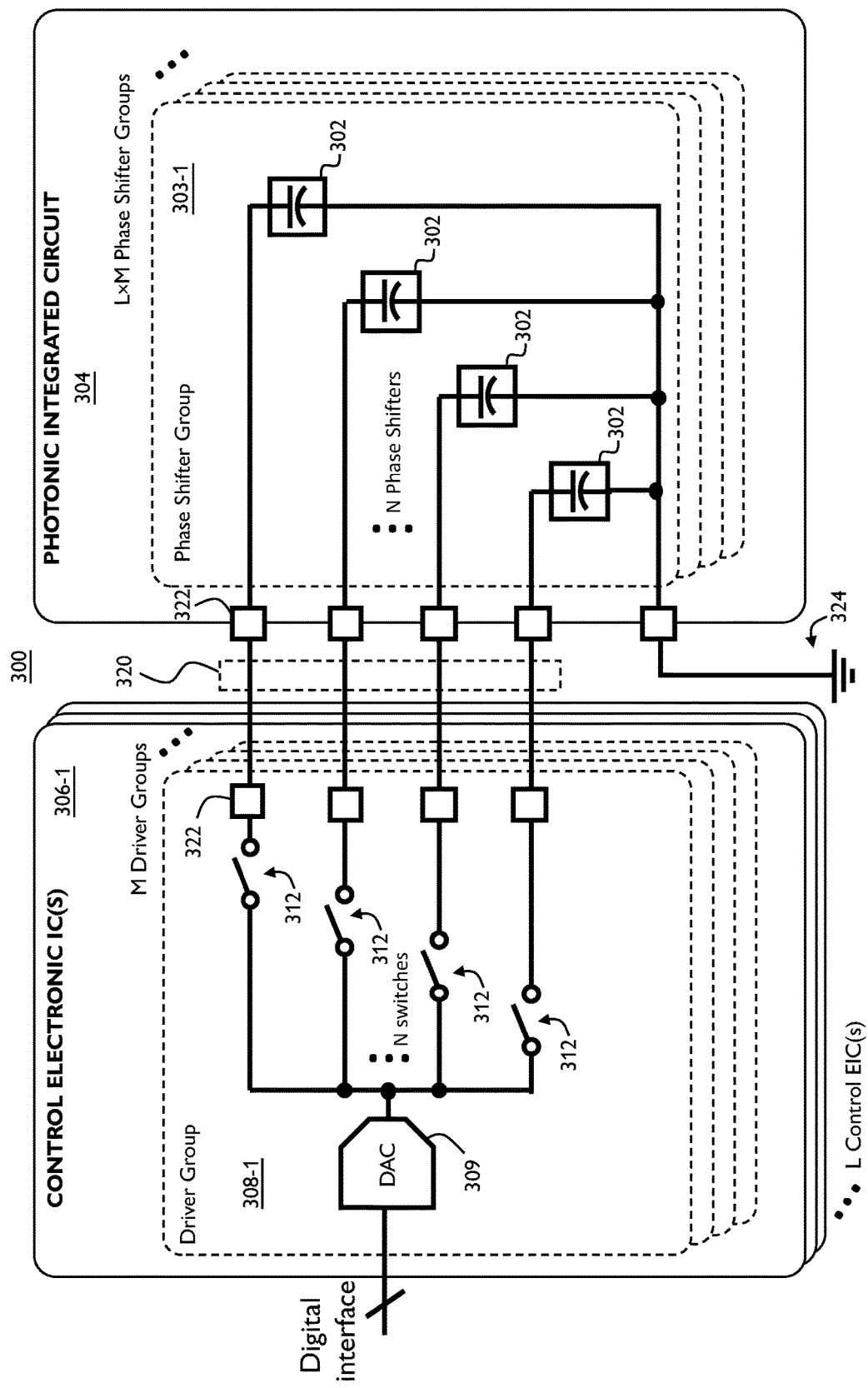
FIG. 3 is a schematic diagram of an example OPA system.

If the phase shifter elements are primarily capacitive (such as a diode in reverse bias acting as a varactor), then a streamlined version of the sample-and-hold architecture is possible, as in the example OPA system 300 shown in FIG. 3. An array of capacitive optical phase shifter elements 302 are arranged in L×M phase shifter groups 303-1, . . . , 303-L×M (referred to generally as a phase shifter group 303) in a PIC 304. One or more (a count of L, where L≥1) control EIC(s) 306-1, . . . , 306-L (referred to generally as a control EIC 306) each include M driver groups 308-1, . . . , 308-M (referred to generally as a driver group 308), where each driver group 308 includes a DAC 309 as a driver element providing current to charge the phase shifter elements 302.

A DAC used as a driver element supplies the current by providing an output voltage according to a predetermined digital value. In other implementations of a driver element, a provided output voltage can be determined according to any type of input. In the case of a capacitive phase shifter element, the (generally nonlinear) current that is supplied substantially stops flowing when the output voltage from the driver element is substantially the same as the input voltage across a corresponding phase shifter element. A set of N analog switches 312 (such as a pass gate or transmission gate, which can be implemented using one or more transistors) provides a controllable connection between the DAC 309 in a driver group 308 and an individual phase shifter element 302 in a corresponding phase shifter group 303 on the PIC 304. In some implementations, only one analog switch 312 per driver group 308 is active (or closed) at a time, allowing a given DAC 309 to connect to a single phase shifter element 302 at a time. A controller (e.g., a digital controller), which can be included on-chip, controls the appropriate analog switches 312 to connect the DAC 309 in a driver group 308 to the appropriate phase shifter element 302 on the PIC 304. A packaging interface includes a connection network 320 between connection structures 322, and a common voltage reference 324 connects terminals of all the phase shifter elements 302.

If the phase shifter element 302 is capacitive in nature (for instance, a reverse-biased diode with minimal leakage current), then the phase shifter element 309 can effectively act as its own sample-and-hold capacitor. As time passes, the phase shifter element 309 in open-circuit mode (i.e., not actively being charged through a closed analog switch) will experience a voltage droop. The controller can ensure that the voltage on the phase shifter element 302 is refreshed prior to the voltage droop having a significant system impact. The controller can allow for smart refreshing; for example, some optical phase shifters with a high voltage may require more frequent refreshing than those devices with lower voltages. This example architecture has the advantage of only requiring one DAC 309 per N phase shifter elements 302, and it also has the advantage of removing the dedicated sample capacitor 114 and buffer 116, saving additional layout area and power. Several system considerations can impact the grouping scheme; for example, the slew rate of the DAC, the parasitic capacitance of the phase shifter device, the voltage droop due to leakage, and the system steering time specification can all impact how many phase shifter elements 302 can be associated with one DAC 309. However, the packaging complexity is still O(n) with the number of phase shifter elements (n=L×M×N).

It can be challenging (e.g., cost prohibitive) for a silicon photonics process to offer full-featured monolithically integrated CMOS with the process features necessary to provide a complete beam steer controller. For example, phase shifters with a high 2× reverse-bias voltage may demand a thick-oxide power transistor, or digital control electronics may demand a state-of-the-art process node. However, providing a limited set of low-performance transistors that can function as analog switches on the photonic integrated circuit may not be as challenging, yielding system architecture advantages and allowing the control electronics to be fabricated in an independent CMOS process. An example OPA system 400 that uses such an architecture is shown in FIG. 4. An array of phase shifter (PS) elements 402 are arranged in L×M phase shifter groups 403-1, ..., 403-L×M (referred to generally as a phase shifter group 403) in a PIC 404. One or more (a count of L, where L≥1) control EIC(s) 406-1, ..., 406-L (referred to generally as a control EIC 406) each include M driver groups 408-1, ..., 408-M (referred to generally as a driver group 408), where each driver group 408 includes N driver elements, which in this example are DACs 409-1, ..., 409-N (referred to generally as a DAC 409). In this example, the control EIC(s) 406 are tightly co-packaged with the PIC 404, and a packaging interface 420 includes connection structures 422 that provide electrical connectivity between a DAC 409 and a row of C phase shifter elements 402. A controller (e.g., a digital controller), which can be included on-chip, includes interface circuitry 418 within each control EIC 406 to provide the appropriate digital value at the input of each DAC 409 and to provide C column enable signals, Column 1 Enable, ..., Column C Enable. The column enable signals control activation of analog switches 412 to allow a single DAC 409 to charge an individual phase shifter element 402 located within the row of phase shifter elements electrically coupled to the analog output of that DAC 409. On the PIC 404, a total of L×M×N×C phase shifter elements 402 are organized into N rows and C columns within each of the L×M phase shifter groups 403. In some implementations, the logical grouping of the row-column arrangement also corresponds to a physical row-column arrangement of the phase shifter elements 402 on a substrate of the PIC 404. The grouping of DACs 409 with phase shifter elements 402 can be determined based on a system architecture tradeoff. Some examples of this architecture rely on the ability of each phase shifter element 402 to act as its own sample capacitor, as previously described. An advantage of this architecture of the OPA system 400 compared to the architecture of the OPA system 300 or the OPA system 100 is the potential reduction of packaging complexity from O(n) down to O($\sqrt{n}$) (n=L× M×N×C). In the example of the OPA system 400, the analog switch 412 is represented as an n-type channel metal-oxide-semiconductor (NMOS) transistor, but could also be a bipolar junction transistor (BJT), a p-type channel metal-oxide-semiconductor (PMOS) transistor, or a pass-gate, for example, or any similarly functioning circuit element.

A silicon photonics process that incorporates CMOS transistors can be used to integrate some or all of the control circuitry into a PIC that includes both photonics components and waveguides for carrying optical signals, and electronic components and wires for carrying electrical signals. FIG. 5 shows an example of an OPA system 500 that has been monolithically integrated, avoiding the need for the complexity associated with packaging multiple integrated circuits. An array of phase shifter (PS) elements 502 are arranged in M phase shifter groups 503-1, ..., 503-M (referred to generally as a phase shifter group 503) in a monolithic PIC 504 that includes electronic elements of the previously separate EIC(s). In this example, there are N DACs 509-1, ..., 509-N (referred to generally as a DAC 509) included in each of the phase shifter groups 503. A controller (e.g., a digital controller), which can be included on-chip, includes interface circuitry 518 to provide the appropriate digital value at the input of each DAC 509 and to provide C column enable signals, Column 1 Enable, ..., Column C Enable. The column enable signals control activation of analog switches 512 to allow a single DAC 509 to charge an individual phase shifter element 502 located within the row of phase shifter elements electrically coupled to the analog output of that DAC 509. Since each phase shifter element 502 can act as its own sample capacitor, system power can be reduced due to small parasitic capacitances, and packaging complexity is effectively gone due to the monolithic integration.

Generally, DAC circuits are designed with linearity as a circuit goal. However, in some implementations of the OPA system, there are advantages to having a nonlinear DAC circuit. FIG. 6A shows an example of a phase shifter response illustrating how a device implementing one of the phase shifter elements may have a nonlinear relationship between the applied voltage (based on the amount of charge accumulated in the device's capacitive charge storage) and the resulting optical phase shift. An example of an associated nonlinear relationship between a particular digital code value input into a nonlinear DAC and the resulting DAC analog voltage at the output of the nonlinear DAC is shown in FIG. 6B. The resulting effect of devices with these characteristics being cascaded together can allow the DAC digital input code value to phase shift conversion to be linear, as shown in FIG. 6C. Alternatively, in some implementations, a nonlinear DAC can be employed to save system power or area, and the calibration can be performed elsewhere in the system.

Figure 7:
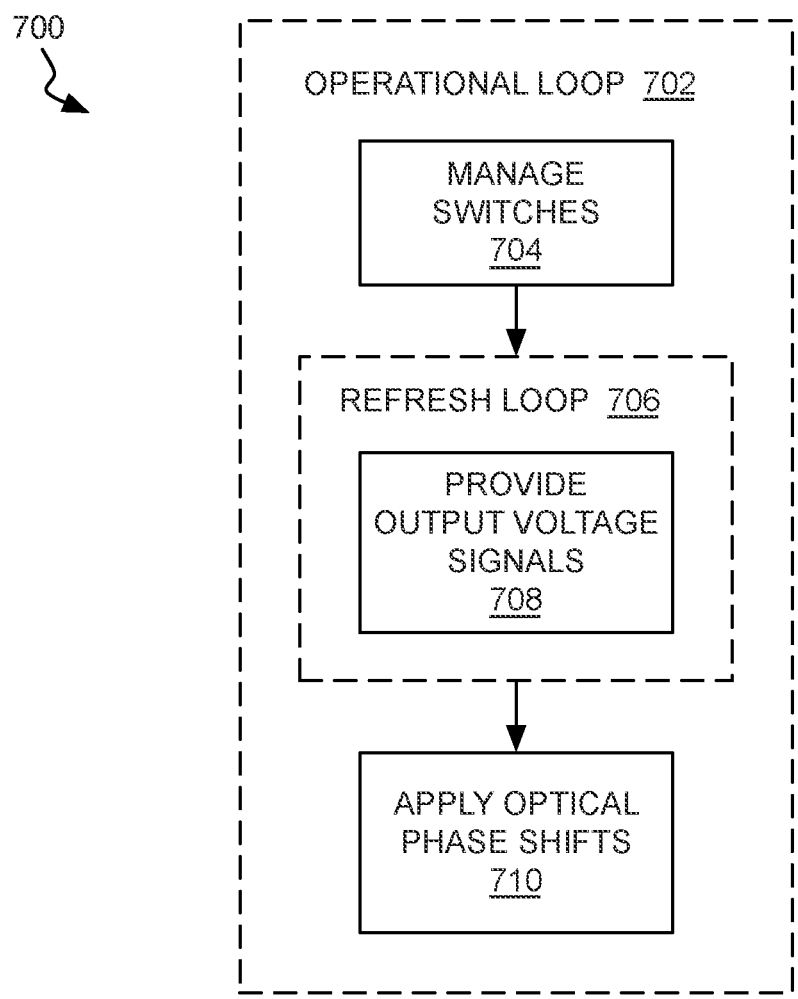
FIG. 7 is a flowchart of an example procedure for operating an OPA system.

FIG. 7 shows a flowchart for an example procedure 700 for operating an OPA system as described herein with operating voltages near a target voltage being maintained by delivering charge to associated capacitors, and/or characteristic capacitance of the phase shifter elements themselves, during periodic refresh cycles that comprises a series of charging time periods. The procedure 700 includes an operational loop 702 in which there are particular voltages that are being driven by driver elements to control the phase shifts in various phase shifter elements. In each pass of the operational loop 702, the procedure 700 includes managing 704 an array of switches to control connectivity between the driver elements and respective phase shifter elements during the charging time periods. The procedure 700 includes a refresh loop 706 in which the driver elements are electrically connected to the phase shifter elements, with each driver element providing 708 an output voltage during a charging time period to determine a corresponding input voltage signal applied across at least one of the phase shifter elements. The procedure 700 includes applying 710 the optical phase shifts by the array of phase shifter elements. Each phase shifter element applies an optical phase shift to an optical wave that propagates through the phase shifter element and propagates to a corresponding emitter element of the optical phased array, where the optical phase shift is based on an input voltage signal applied across first and second terminals of the phase shifter element. In some implementations, all of the second terminals of all of the phase shifter elements in the array of phase shifter elements are maintained at a common voltage during the charging time period. In some implementations, the total number of switches in the array of switches is at least as large as the total number of phase shifter elements in the array of phase shifter elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
    an array of emitter elements;
    an array of phase shifter elements, each phase shifter element configured to apply an optical phase shift to an optical wave that propagates through the phase shifter element and propagates to a corresponding emitter element, where the optical phase shift is based on an input voltage signal applied across first and second terminals of the phase shifter element;
    an array of driver elements, each driver element configured to provide an output voltage signal during a charging time period to determine a corresponding input voltage signal applied across at least one of the phase shifter elements, where all of the second terminals of all of the phase shifter elements in the array of phase shifter elements are maintained at a common voltage during the charging time period; and
    an array of switches configured to control connectivity between the driver elements and respective phase shifter elements during the charging time period, where the total number of switches in the array of switches is at least as large as the total number of phase shifter elements in the array of phase shifter elements.

2. The apparatus of claim 1, wherein the array of phase shifter elements is provided on a photonic integrated circuit.

3. The apparatus of claim 2, wherein the array of driver elements is provided on an electronic integrated circuit electrically connected to the photonic integrated circuit.

4. The apparatus of claim 3, wherein the array of switches is provided on the electronic integrated circuit.

5. The apparatus of claim 4, wherein at least one of the driver elements in the array of driver elements comprises a digital-to-analog converter with an output voltage that is coupled to a plurality of the switches in the array of switches.

6. The apparatus of claim 5, wherein the electronic integrated circuit includes capacitors coupled to the switches storing charge accumulated from the output voltage signals provided from the driver elements during the charging time period, and the capacitors provide the input voltage signals applied across the phase shifter elements.

7. The apparatus of claim 5, wherein the output voltage signals are connected to the first terminal of one or more of the phase shifter elements that are selected according to the array of switches, and the input voltage signals are provided based on capacitance characteristics of the phase shifter elements.

8. The apparatus of claim 3, wherein the array of switches is provided on the photonic integrated circuit.

9. The apparatus of claim 8, wherein at least two driver elements in the array of driver elements comprise digital-to-analog converters with outputs coupled to different respective rows of phase shifter elements, and a plurality of column enable signals control the connectivity to a selected column of phase shifter elements that consists of a single phase shifter element from each of the rows of phase shifter elements.

10. The apparatus of claim 9, wherein the input voltage signals are provided based on capacitance characteristics of the phase shifter elements.

11. The apparatus of claim 2, wherein the array of driver elements is provided on the photonic integrated circuit, and the array of switches is provided on the photonic integrated circuit.

12. The apparatus of claim 11, wherein at least two driver elements in the array of driver elements comprise digital-to-analog converters with outputs coupled to different respective rows of phase shifter elements, and a plurality of column enable signals control the connectivity to a selected column of phase shifter elements that consists of a single phase shifter element from each of the rows of phase shifter elements.

13. The apparatus of claim 12, wherein the input voltage signals are provided based on capacitance characteristics of the phase shifter elements.

14. The apparatus of claim 1, wherein each phase shifter element in the array of phase shifter elements comprises a reverse-biased diode device.

15. The apparatus of claim 14, wherein at least one of the phase shifter elements in the array of phase shifter elements comprises a plurality of reverse-biased diode devices connected in series with each other.

16. The apparatus of claim 14, wherein at least one of the phase shifter elements in the array of phase shifter elements comprises a reverse-biased diode device connected in series with an inductor.

17. The apparatus of claim 1, wherein each switch in the array of switches comprises at least a first, second, and third terminal, where a flow of current between the first and second terminals is controlled based on a voltage or current applied at the third terminal.

18. A method for controlling an optical phased array, the method comprising:
applying optical phase shifts by an array of phase shifter elements, each phase shifter element applying an optical phase shift to an optical wave that propagates through the phase shifter element and propagates to a corresponding emitter element of the optical phased array, where the optical phase shift is based on an input voltage signal applied across first and second terminals of the phase shifter element;
providing output voltage signals from an array of driver elements, each driver element providing an output voltage signal during a charging time period to determine a corresponding input voltage signal applied across at least one of the phase shifter elements, where all of the second terminals of all of the phase shifter elements in the array of phase shifter elements are maintained at a common voltage during the charging time period; and
managing an array of switches to control connectivity between the driver elements and respective phase shifter elements during the charging time period, where the total number of switches in the array of switches is at least as large as the total number of phase shifter elements in the array of phase shifter elements.

19. The method of claim 18, wherein the charging time period comprises a period of a periodic refresh cycle during which the input voltage signals are refreshed based on capacitance characteristics of the phase shifter elements.

20. The method of claim 18, wherein managing the array of switches to control connectivity of the driver elements comprises selecting a first switch coupled to a first phase shifter element in a group of the plurality of phase shifter elements to allow current flow to the first phase shifter element during the charging time period, and selecting switches coupled to all other phase shifter elements in the group other than the first phase shifter element to substantially prevent current flow during the charging time period.

* * * * *